United States Patent [19]
Inaba

[11] Patent Number: 5,641,231
[45] Date of Patent: Jun. 24, 1997

[54] TEMPERATURE MONITORING APPARATUS EQUIPPED WITH GAS CHAMBER FOR CONVERTING TEMPERATURE TO GAS PRESSURE

[75] Inventor: Shoichi Inaba, Tokyo, Japan

[73] Assignee: NEC Corporation, Tokyo, Japan

[21] Appl. No.: 404,745

[22] Filed: Mar. 15, 1995

[30] Foreign Application Priority Data

Mar. 16, 1994 [JP] Japan .................................. 6-071446

[51] Int. Cl.$^6$ ................................................ G01K 3/08
[52] U.S. Cl. .................................. 374/137; 374/143
[58] Field of Search ............................ 374/100, 102, 374/110, 112, 115, 137, 142, 143, 187, 188, 208; 73/31.03, 714; 364/557

[56] References Cited

U.S. PATENT DOCUMENTS

| | | | |
|---|---|---|---|
| 4,501,504 | 2/1985 | Urmenyi et al. | 374/112 |
| 4,566,807 | 1/1986 | Koolen | 374/143 |
| 4,802,370 | 2/1989 | EerNisse et al. | 374/143 |
| 5,153,823 | 10/1992 | Ries et al. | 374/143 |
| 5,156,461 | 10/1992 | Moslehi et al. | 374/137 |
| 5,324,111 | 6/1994 | Hasegawa | 374/143 |

*Primary Examiner*—G. Bradley Bennett
*Attorney, Agent, or Firm*—Sughrue, Mion, Zinn, Macpeak & Seas

[57] ABSTRACT

A temperature monitoring apparatus has a plurality of cells held in contact with a heater unit having a temperature distribution, a plurality of pressure sensors for measuring pressure differences, a gas pipeline network connected between the plurality of cells and the plurality of pressure sensors and a data processing unit for calculating temperature differences between two of the plurality of cells on the basis of an initial temperature and an initial gas pressure of one of the plurality of cells measured before heating, and the temperature distribution measured by the temperature monitoring apparatus is accurate rather than a temperature monitoring apparatus using thermo couples.

12 Claims, 7 Drawing Sheets

TEMPERATURE MONITORING APPARATUS EQUIPPED WITH GAS CHAMBER FOR CONVERTING TEMPERATURE TO GAS PRESSURE

FIELD OF THE INVENTION

This invention relates to a temperature monitoring apparatus and, more particularly, to a temperature monitoring apparatus having gas chambers each converting temperature to gas pressure.

DESCRIPTION OF THE RELATED ART

A temperature monitoring apparatus is incorporated in various apparatus. FIG. 1 illustrates a typical example of the prior art temperature monitoring apparatus incorporated in a chemical vapor deposition system. The chemical vapor deposition system has a reactor 1 defining a reaction chamber 1a, and the reaction chamber 1a is conducted through a valve unit 2 to a vacuum pump unit 3. A heater unit 4 is accommodated in the reaction chamber 1a, and a semiconductor wafer 5 is mounted on the heater unit 4. A plurality of thermo couples 6 are adhered to the heater unit 4 at intervals, and are connected through compensating lead wires 7 to a temperature recorder (not shown). Each of the thermo couples 6 generates thermoelectric power, and the associated compensating lead wire 7 transfers the thermoelectric power to the temperature recorder.

The temperature recorder converts the thermoelectric power to a corresponding temperature, and the temperature distribution on the heater unit 4 is recorded by the temperature recorder.

The prior art temperature monitoring apparatus encounters a problem in the accuracy of the temperature distribution. As described hereinbefore, the thermo couples 6 are adhered to the heater unit 4. The adhesion requires adhesive paste, and the adhesive paste forms adhesive films between the heater unit 4 and the thermo couples 6. This results in that heat is transferred from the heater unit 4 through the adhesive films to the thermo couples 6. However, it is quite difficult to make the thicknesses of the adhesive films constant, and the amount of heat to be transferred is varied in inverse proportion to the thickness of the adhesive film. For this reason, the temperature distribution on the heater unit 4 is hardly transferred to the thermo couples, and the temperature recorder records an inaccurate temperature distribution.

Another problem inherent in the prior art temperature monitoring apparatus is a frequent exchanging work of the thermo couplers 6. Although a k-type thermo coupler has a wide measuring range between −200° C. and 1200° C., the k-type thermo coupler suffers a large measuring error of up to 10° C. even within the measuring range. The chemical vapor deposition requires a strict temperature control, and an operator changes the thermo couplers 6 to appropriate ones depending upon the temperature control range. Thus, the frequent exchanging work is required for the prior art temperature monitoring apparatus.

The third problem inherent in the prior art temperature monitoring apparatus is a large error due to the compensating lead wires 7 and the temperature recorder. In detail, if the prior art temperature monitoring apparatus is used for a narrow measuring range, the thermo couplers 6 are more reliable than for a wide measuring range, and the measuring error is relatively small without requiring the frequent exchanging work. However, the compensating lead wires 7 create errors of ±3° C. around 1000° C., and the temperature recorder usually brings an error of ±6° C. into the temperature distribution around 1000° C.

SUMMARY OF THE INVENTION

It is therefore an important object of the present invention to provide a temperature monitoring apparatus which has a high accuracy over a wide measuring range without a complex work.

The present inventor contemplated the problems, and noticed that the problems related to thermo couples. The present inventor tried to convert gas pressure to a temperature, and confirmed an accurate relation between the volume change and the temperature.

To accomplish the object, the present invention proposes to measure a pressure of gas exposed to a source of heat.

In accordance with one aspect of the present invention, there is provided a temperature monitoring apparatus used for a plurality of areas having a temperature distribution, comprising: a) a heat conductive means defining a plurality of cells supplied with heat from the plurality of areas, each of the plurality of cells being filled with gas; b) at least one pressure sensor unit having two input ports respectively connected to two cells selected from the plurality of cells, and measuring a pressure difference between the two input ports; c) an initial condition measuring means operative to measure an initial temperature and an initial gas pressure of one of the two cells before the temperature distribution takes place between the plurality of areas; and d) a data processing unit calculating a temperature difference between the two cells on the basis of the initial temperature, the initial pressure and the pressure difference after the temperature distribution takes place.

In accordance with another aspect of the present invention, there is provided a temperature monitoring apparatus provided for a heat source having a temperature distribution, comprising: a) a converting block having a plurality of cells each filled with gas, and transferring a plurality of heat fluxes to the plurality of cells, one of the plurality of cells serving as a reference cell; b) a plurality of differential pressure sensor units having respective first input ports connected to the reference cell and respectively second input ports respectively connected to the others of the plurality of cells, and operative to measure pressure differences between gas pressures in the others of the plurality of cells and a gas pressure in the reference cell for generating first signals indicative of the pressure differences, respectively, in the presence of the temperature distribution; c) a gas supplying system for supplying the gas to each of the plurality of cells; d) a measuring means operative to measure an initial pressure of the plurality of cells and an initial temperature of the plurality of cells before the temperature distribution takes place, the measuring means being further operative to measure a pressure of the gas in the reference cell after the temperature distribution takes place, the measuring means being further operative to generate a second signal indicative of the initial pressure, a third signal indicative of the initial temperature and a fourth signal indicative of the pressure of the gas in the reference cell; and e) a data processing unit responsive to the second signal, the third signal and the fourth signal for calculating a temperature of the gas in the reference cell, the data processing unit being further responsive to the first signals supplied from the differential pressure sensor units associated with the others of the plurality of cells for calculating temperature differences between the gases in the others of the plurality of cells and the reference cell.

BRIEF DESCRIPTION OF THE DRAWINGS

The features and advantages of the temperature monitoring apparatus according to the present invention will be more clearly understood from the following description taken in conjunction with the accompanying drawings in which.

DESCRIPTION OF THE PREFERRED EMBODIMENTS

First Embodiment

Figure 1:
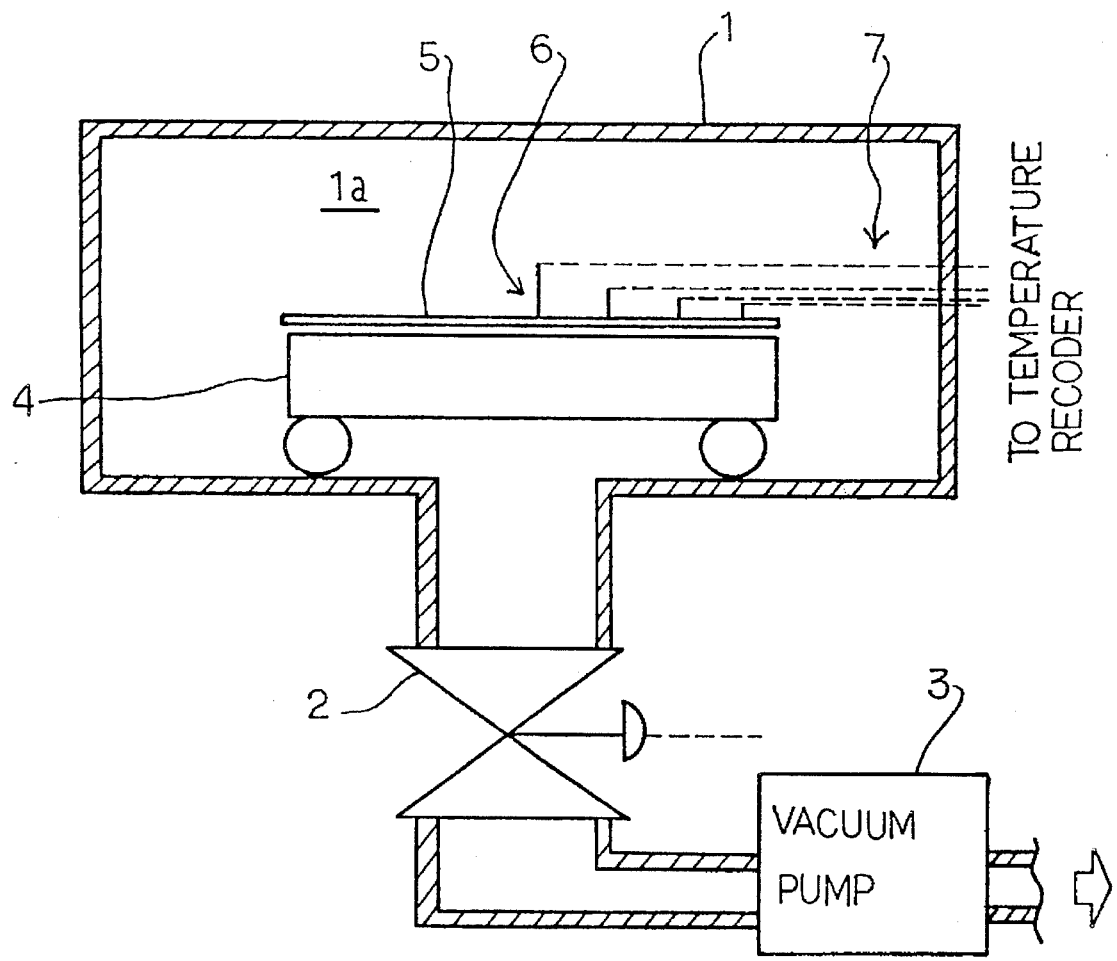
FIG. 1 is a partially cross sectional schematic view showing the prior art temperature monitoring apparatus.
Figure 2:
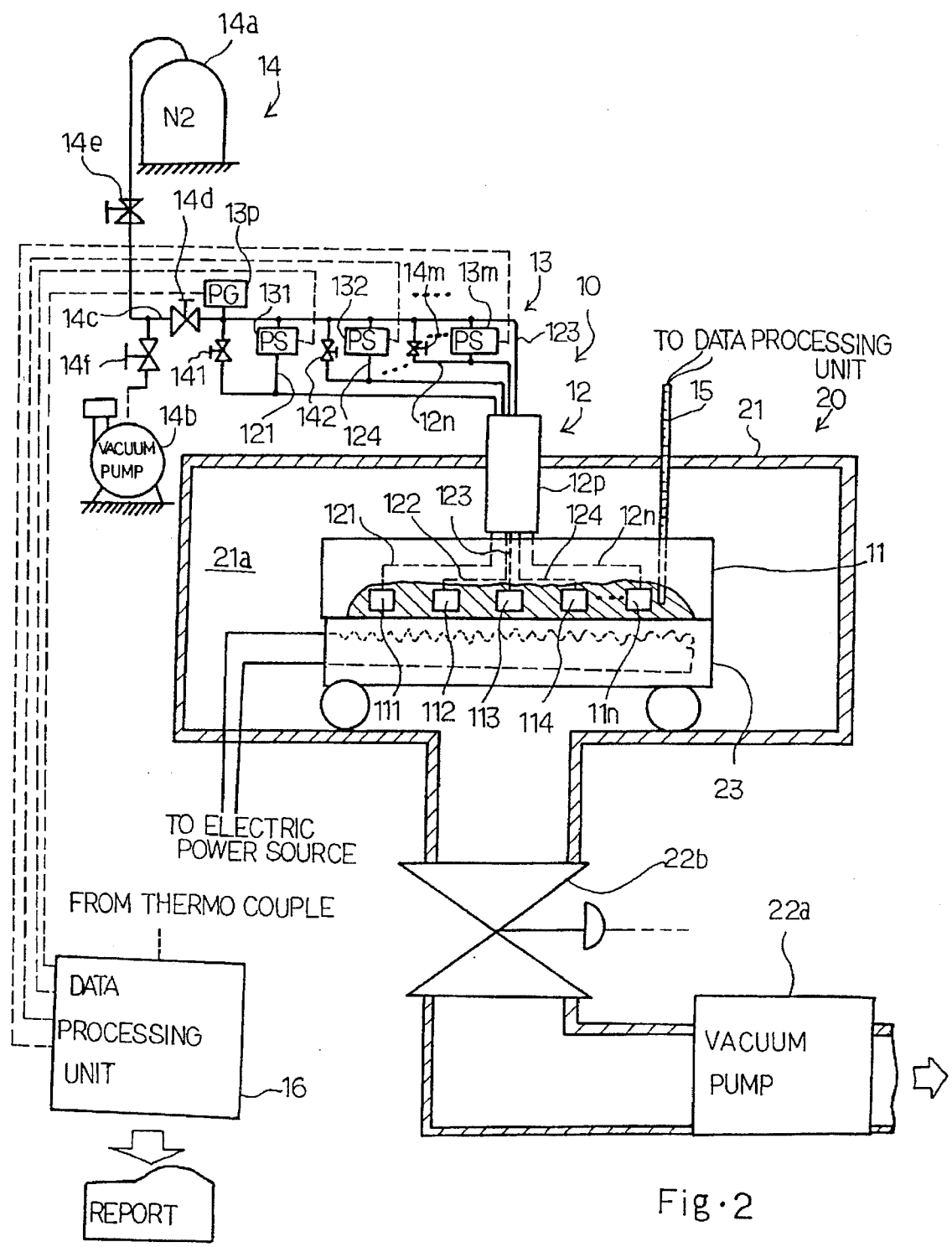
FIG. 2 is a partially cross sectional schematic view showing a temperature monitoring apparatus according to the present invention.

Referring to FIG. 2 of the drawings, a temperature monitoring apparatus 10 embodying the present invention is provided in association with a chemical vapor deposition system 20. The chemical vapor deposition system 20 comprises a reactor 21 defining a reaction chamber 21a, gas supply nozzles (not shown), a vacuum pump 22a connected through a control valve unit 22b to the reaction chamber 21a and a heater unit 23 placed in the reaction chamber 21a, and a semiconductor wafer (not shown) is heated by the heater unit 23. The chemical vapor deposition system is well known to a person skilled in the art, and no further description is incorporated hereinbelow.

The temperature monitoring apparatus 10 monitors the heater unit 23, and largely comprises a converting block 11, a gas distribution network 12, a pressure sensor array 13, a gas supply system 14, a pressure gauge PG, a thermo couple 15 and a data processing unit 16. The pressure gauge PG and the thermo couple 15 as a whole constitute an initial condition measuring means.

The converting block 11 is formed of a highly heat conductive metal such as, for example, aluminum or nickel, and a plurality of cells 111, 112, 113, 114, ... and 11n are formed in the converting block 11. The converting block 11 is in the form of bulk, and the cells 111 to 11n are close to the bottom surface of the converting block 11 held in contact with the upper surface of the heater unit 23. The cells 111 to 11n are equally spaced from the bottom surface of the converting block 11, and, for this reason, the temperatures at the cells 111 to 11n are exactly in proportional relation to the areas of the heater unit 23 beneath the cells 111 to 11n. The cells 111 to 11n are equal in volume to one another, and each of the cells 111 to 11n is V1 in volume. A semiconductor wafer may be mounted on an upper surface of the converting block 11.

As will be described in detail, the cell 113 serves as a reference cell, and a temperature distribution on the heater unit 23 is represented by differences from the temperature of the area beneath the reference cell 113.

The gas distribution network 12 comprises a plurality of pipe lines 121, 122, 123, ... and 12n respectively open to the cells 111 to 11n and a constant temperature block 12p, and the pipe lines 121 to 12n pass through the constant temperature block 12p. The pipe lines 121 to 12n are formed of a heat-resisting and highly airtight substance such as, for example, quartz or titanium, and are partially held in contact with one another. The pipe lines 121 to 12n are equal in volume, and each of the pipe lines 121 to 12n is V2 in volume. The volume V2 is much smaller than the volume V1, and the ratio of the volume V1 to the volume V2 is less than 0.01. For this reason, even if each of the pipe lines 121 to 12n becomes different in temperature from the associated cell, the temperature in the pipe line has only small influence on the pressure in the associated cell.

Figure 3:
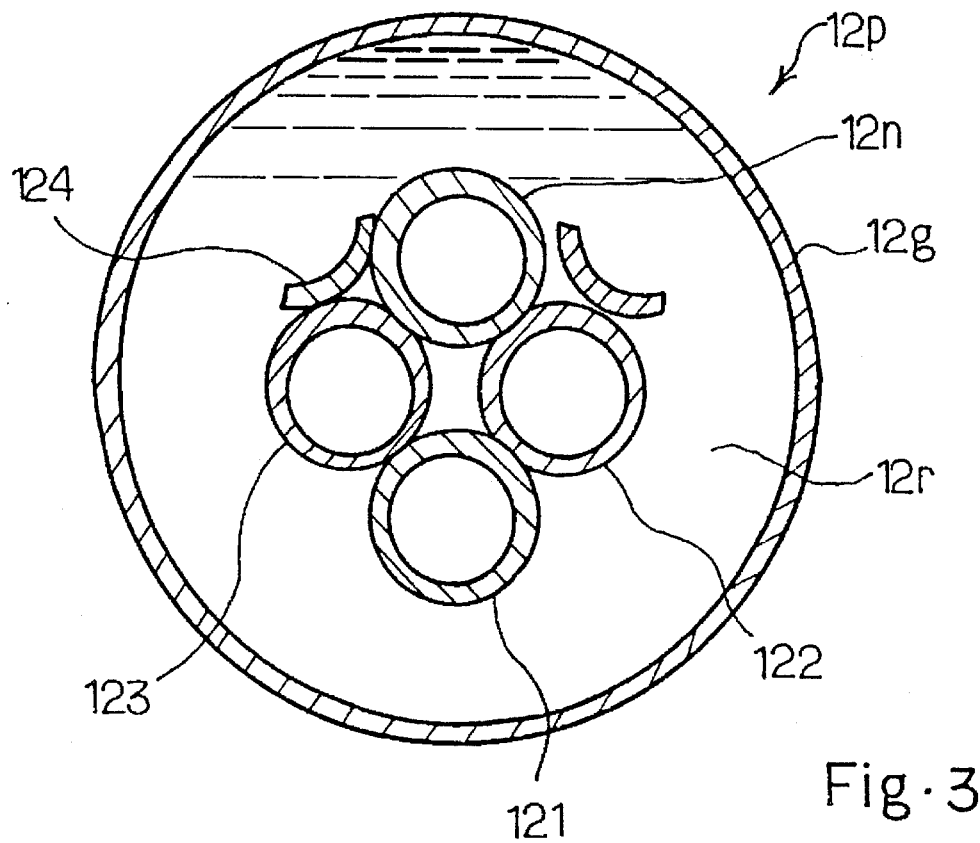
FIG. 3 is a cross sectional view showing a constant temperature block incorporated in the temperature monitoring apparatus.
Figure 4:
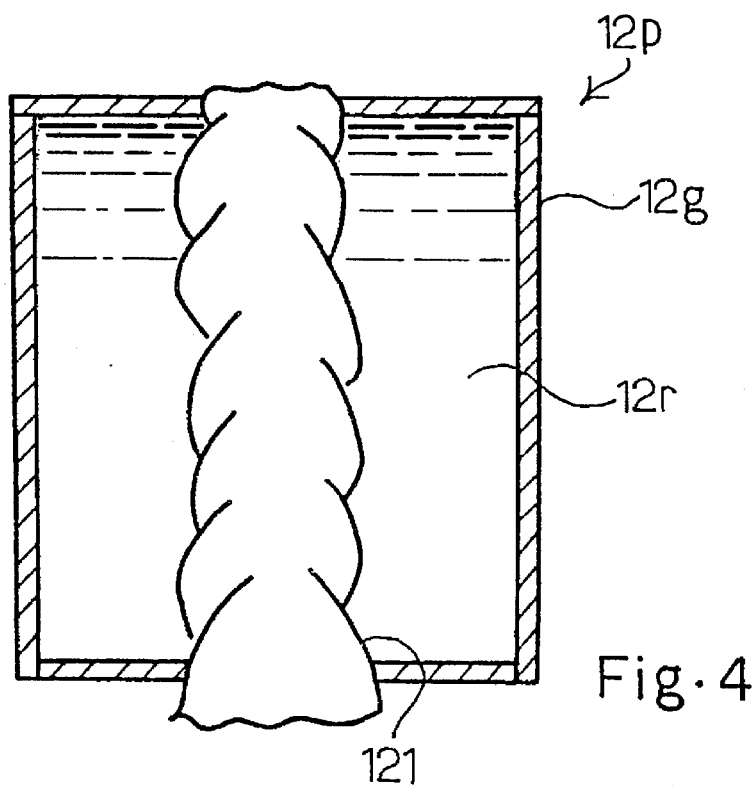
FIG. 4 is a cross sectional view showing an inner pipe incorporated in the constant temperature block.

As will be seen in FIGS. 3 and 4 of the drawings, the constant temperature block 12p has an outer shell filled with highly heat conductive liquid 12r. The pipe lines 121 to 12n pass through the highly heat conductive liquid 12r, and exchange the heat through the highly heat conductive liquid 12r. For this reason, the pipe lines 121 to 12n are regulated to a certain temperature, and a difference in temperature among the pipe lines 121 to 12n is of the order of 1° C. Although the constant temperature block 12p makes the temperatures in the pipe lines 121 to 12n different from the temperatures in the associated cells 111 to 11n, the pressures in the cells 111 to 11n are hardly affected by the temperature variation, because the volume V2 is much smaller than the volume V1 as described hereinbefore. The constant temperature block 12p may be associated with a heat exchanger (not shown) so as to keep the temperature of the highly heat conductive liquid constant.

Turning back to FIG. 2 of the drawings, the pressure sensor array 13 comprises (n−1) differential pressure sensor units 131, 132, ... and 13m. The differential pressure sensor units 131 to 13m can measure a differential pressure of 10 torr (or 1333.2 Pa) at the maximum, and the accuracy of the differential pressure sensor units 131 to 13m is of the order of 0.15 per cent.

The differential pressure sensor units 131 to 13m have respective first ports connected to the pipe line 123 associated with the reference cell 113 and respective second ports respectively connected to the remaining pipe lines 121, 122, 124, ... and 12n. Thus, the differential pressure sensor units 131 to 13m are respectively associated with the cells 111, 112, 114, ... and 11n, and the differential pressure sensor units 131 to 13m respectively measure differential pressures between the associated cells 111, 112, 114, ... and 11n and the reference cell 113. The differential pressure sensor units 131 to 13m generate output signals indicative of the differential pressures, and supply the output signals to the data processing unit 16.

The pressure gauge PG is connected to the pipe line 123, and measures the pressure in the pipe line 123 and, accordingly, the reference cell 113. The pressure gauge PG generates an output signal indicative of the pressure, and supplies the output signal to the data processing unit 16.

The gas supply system 14 comprises a high pressure gas tank 14a, a vacuum pump 14b, a pipe line network 14c connected to the high pressure gas tank 14a and the vacuum pump 14b, a value unit 14d connected between the pipe line network 14c and the pipe line 123, valve units 14e and 14f associated with the high pressure gas tank 14a and the vacuum pump 14b and valve units 141, 142, . . . and 14m connected between the valve unit 14d and the other pipe lines 121, 122, 124, . . . and 12n. These valve units 14d, 14e, 14f and 141 to 14m may be controlled by a controller. The high pressure gas tank 14a keeps high pressure nitrogen gas, and the pipe lines 121 to 12n and the cells 111 to 11n are regulated to a certain pressure by appropriately controlling the valve units 14d, 14e, 14f and 141 to 14m. Another inert gas may be available.

The thermo couple 15 is inserted into the converting block 11, and measures an initial temperature of the converting block 11. The thermo couple 15 generates an output signal indicative of the initial temperature, and supplies the output signal to the data processing unit 16.

The data processing unit 16 calculates an actual temperature of the reference cell 113 and temperature differences of the other cells 111, 112, 114, . . . and 11n with respect to the temperature of the reference cell 113.

In detail, if the heat application to the converting block 11 changes an initial pressure P0 in the reference cell 113 at the initial temperature T0 to a pressure P1, the Charle's law is established as follows.

$$P0/T0 = P1/T1 \qquad \text{Equation 1}$$

where T1 is the temperature at the pressure P1. T0 and T1 are the temperatures in Kelvin scale.

From equation 1, the temperature T1 is given by equation 1'.

$$T1 = (P1/P0) \times T0 \qquad \text{Equation 1'}$$

If another cell has a pressure P2, the temperature difference dT between the reference cell 113 and another cell is expressed by equation 2.

$$P1/T1 = P2/(T1+dT) \qquad \text{Equation 2}$$

The temperature difference dT is given by equation 2'.

$$dT = \{(P2/P1) - 1\} \times T1 \qquad \text{Equation 2'}$$

If T0 and T1 are indicative of temperatures in centigrade, equation 1' and equation 2' are expressed as follows.

$$T1 = (P1/P0) \times (273.15+T0) - 273.15 \qquad \text{Equation 1''}$$

$$dT = \{(P2/P1) - 1\} \times (273.15+T1) \qquad \text{Equation 2''}$$

Thus, the data processing unit 16 calculates the temperature differences of the cells 111, 112, 114, . . . and 11n with respect to the actual temperature of the reference cell 113. The data processing unit 16 may output a report describing a temperature distribution on the heating unit 23. As described hereinbefore, the differential pressure sensor units 131 to 13m can measure the maximum differential pressure of 10 torr, and the maximum temperature difference of 29° C. is detectable by the temperature monitoring apparatus embodying the present invention. The accuracy of the differential pressure sensor units 131 to 13m is 0.15 per cent, and an error due to the differential pressure sensor units 131 to 13m is only 0.05° C. without an influence of the pipe lines 121 to 12n. For this reason, the temperature monitoring apparatus embodying the present invention can determine the temperature distribution at high accuracy.

Figure 5:
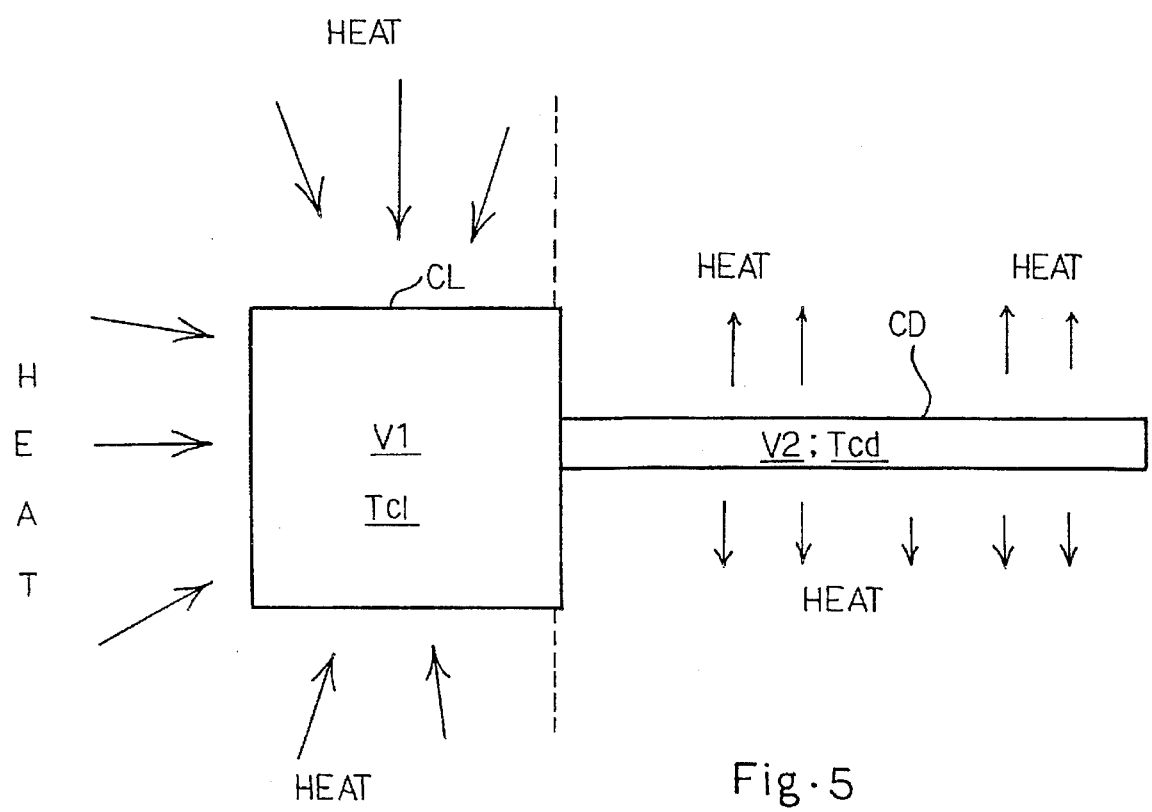
FIG. 5 is a view showing a cell and a pipe line open to the cell for discussing an influence on the accuracy of a detected temperature.

Subsequently, an influence of the pipe lines 121 to 12n is discussed with reference to FIG. 5. In FIG. 5, CL and CD are representative of an inner space of each cell 111 to 11n and a gas conduit formed in each pipe line 121 to 12n, respectively, and the inner space CL and the gas conduit CD are assumed to respectively have the volume V1 and the volume V2. A gas is sealed in the inner space CL and the gas conduit CD, and is assumed to be the ideal gas. The temperature in the inner space CL is labeled with Tcl, and the temperature in the gas conduit CD with Tcd. The ideal gas in the inner space CL is continuously heated, and is assumed to be 400° C. On the other hand, the ideal gas in the gas conduit CD is also assumed to be maintained at 20° C. due to the highly heat conductive liquid 12r of the constant temperature block 12p. However, the inner space CL is contiguous to the gas conduit CD, and the gas pressure in the inner space CL is equal to the gas pressure in the gas conduit CD.

If the temperatures Tcl and Tcd are equal to room temperature Tr, the following equation is established.

$$Pr (V1+V2) = n \times R \times Tr \qquad \text{Equation 3}$$

where Pr is the pressure of the ideal gas at the room temperature, n is the moles of the ideal gas and R is the gas constant.

When the temperatures Tcl and Tcd reach 400° C. and 20° C., respectively, equations 4 and 5 are satisfied in the inner space CL and the gas conduit CD.

$$PV1 = n1 \times R \times Tcl \qquad \text{Equation 4}$$

$$PV2 = n2 \times R \times Tcd \qquad \text{Equation 5}$$

where n1 is moles of the ideal gas in the inner space CL and n2 is moles of the ideal gas in the gas conduit CD.

Equations 4 and 5 are substituted for equation 3, and equation 6 is obtained.

$$Pr (V1+V2) = P\{(V1/V2)+(V2/T2)\}Tr \qquad \text{Equation 6}$$

When the temperature Tcd and the pressure P are increased to (Tcd+dT) and (P+dP), equation 6 is also established, and the equation for (Tcd+dT) and (P+dP) is referred to equation 7. The difference between equation 6 and equation 7 results in equation 8 as follows.

$$P(V2/Tcd - V2/(Tcd+dT)) - dp(V1/Tcl + V2/(Tcd+dT)) = 0 \qquad \text{Equation 8}$$

Equation 8 is changed to equation 8'.

$$dP/P = C \; dT/Tcd/(C+Tcd+dT) \qquad \text{Equation 8'}$$

where dP is a difference between the pressure P and pressure Pcd in the gas conduit and C is a constant equal to (V2 × Tcl/V1).

Figure 6:
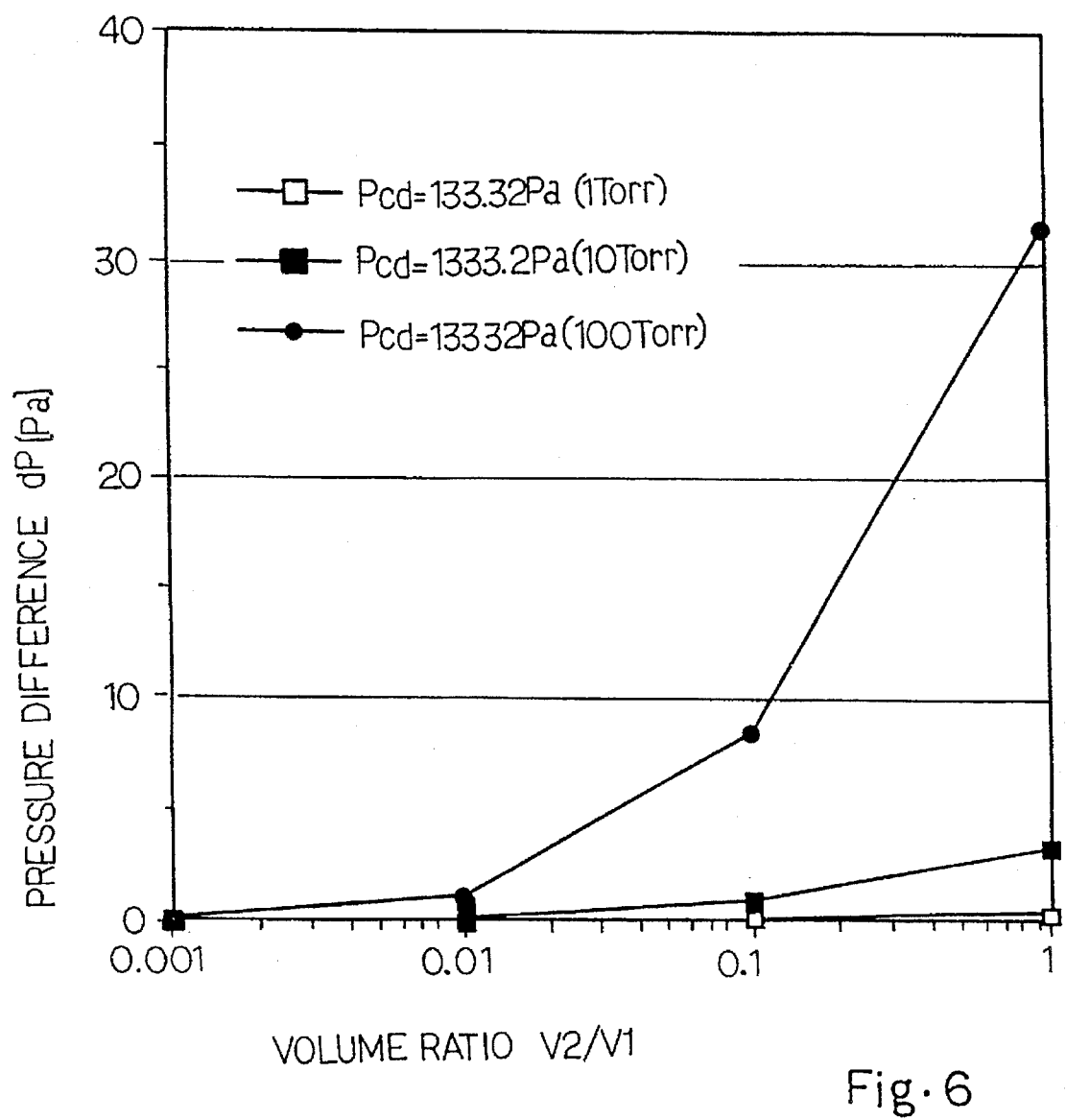
FIG. 6 is a graph showing a pressure difference between the cell and the pipe line in terms of a volume ratio.

In equation 8', Tcl is 673.15° K., Tcd is 293.15° K. and dT is 1.0° K. dP is plotted in terms of the volume ratio (V2/V1) as shown in FIG. 6.

It is understood from FIG. 6 that the pressure difference dP or the influence due to the difference between the temperatures Tcl and Tcd is ignoreable regardless of the gas pressure Pcd in so far as the volume ratio (V2/V1) is equal to or less than 0.01.

In this instance, if the volume ratio (V2/V1) is 0.01, the pressure P is 230 torr (or 30663.6 Pa) and the temperature difference among the pipe lines 121 to 12n falls within 1° C., the pressure difference dP is calculated by using equation 8'. C is 6.7315.

$$dP = 6.7315 \times 1.0 \times 30663.6/293.15/(6.7315+293.15+1.0) = 2.3391 \text{ Pa (or 0.0175 torr)}$$

The pressure difference dP of 2.3391 Pa is equivalent to 0.05° C., and the influence of the pipe lines 121 to 12n is only 0.05° C. around 400° C. The highly heat conductive liquid 12r is expected to maintain a temperature difference between the pipe lines 121 to 12n within 1° C., and the total error of the temperature monitoring apparatus is much smaller than that of the prior art temperature monitoring system.

Description is hereinbelow made on the temperature monitoring operation for determining a temperature distribution on the heater unit 23. First, the vacuum pump 22a develops vacuum in the reaction chamber 21a, and the valves 141 to 14m are opened so as to conduct the cells 111 to 11n through the pipe lines 121 to 12n and the valve units 141 to 14m. The valve unit 14d is opened, and the valves 14e and 14f are controlled in such a manner as to regulate the pressure in the cells 111 to 11n to 100 torr (or 13332 Pa). The differential pressure sensor units 131 to 13m confirm that the differential pressures are zero. Then, the valve unit 14d is closed, and the thermo couple 15 and the pressure gauge PG measure the initial temperature and the initial pressure. The thermo couple 15 and the pressure gauge PG supply the output signals indicative of the initial temperature and the initial pressure to the data processing unit 16, and the valve units 141 to 14m are closed. As a result, the cells 111 to 11n are isolated from one another. The initial temperature T0 is assumed to be 20° C., and a temperature distribution does not take place.

The heater unit 23 starts heating, and a chemical vapor deposition is carried out. The heat fluxes passes through the areas of the upper surface of the heater unit 23 beneath the cells 111 to 11n, and reach the cells 121 to 12n through the bottom portion of the converting block 11. As a result, each heat flux heats up the nitrogen gas in the associated cell, and the gas pressure is increased together with the temperature.

The data processing unit 16 starts the monitoring operation at an appropriate timing. The pressure gauge PG is assumed to be 230 torr at the timing, and the data processing unit 16 firstly fetches the output signal of the pressure gauge PG. The data processing unit 16 calculates the gas temperature T1 by using equation 1", and determines the gas temperature in the reference cell 113 to be 401.10° C.

Subsequently, the data processing unit 16 sequentially fetches the output signals of the differential pressure sensor units 131 to 13m. If the output signal of the differential pressure gauge unit 132 is indicative of the differential pressure of 0.01 torr (or 13.332 Pa), the data processing unit 16 calculates the temperature difference dT by using equation 2", and decides the temperature difference between the cells 113 and 114 to be 0.29° C. The data processing unit similarly calculates the temperature differences between the cells 111, 112, 114, . . . and 11n and the reference cell 113, and completes the temperature distribution on the heater unit 23.

As will be appreciated from the foregoing description, the temperature monitoring apparatus according to the present invention coverts a temperature distribution into pressure differences of the gas, and measures the pressure differences by means of the differential pressure sensor units. The differential pressure sensor units are so sensitive that the data processing unit exactly determines the temperature distribution.

The constant temperature block keeps the gas temperatures in the pipe lines constant, and, accordingly, the temperature differences in the cells are exactly converted into the gas pressures without influence of the environment. Moreover, if the volume ratio of each pipe line to the associated cell is not greater than 0.01, the influence of the inner volume of each pipe line is ignoreable, and the differential pressure sensor units due to the thermal expansion are exactly detected by the differential pressure sensor units. The highly heat conductive substance of the converting block 11 eliminates a temperature gradient between the heater unit and the cells, and the position of the cells makes the temperature distribution determined by the data processing unit approximately equal to the actual temperature distribution on the heater unit.

Moreover, when the converting block 11 is only placed on the heater unit 23, the temperature monitoring apparatus immediately becomes ready for monitoring, and an operator easily installs the temperature monitoring apparatus. This results in reduction in running cost.

Second Embodiment

Figure 7A:
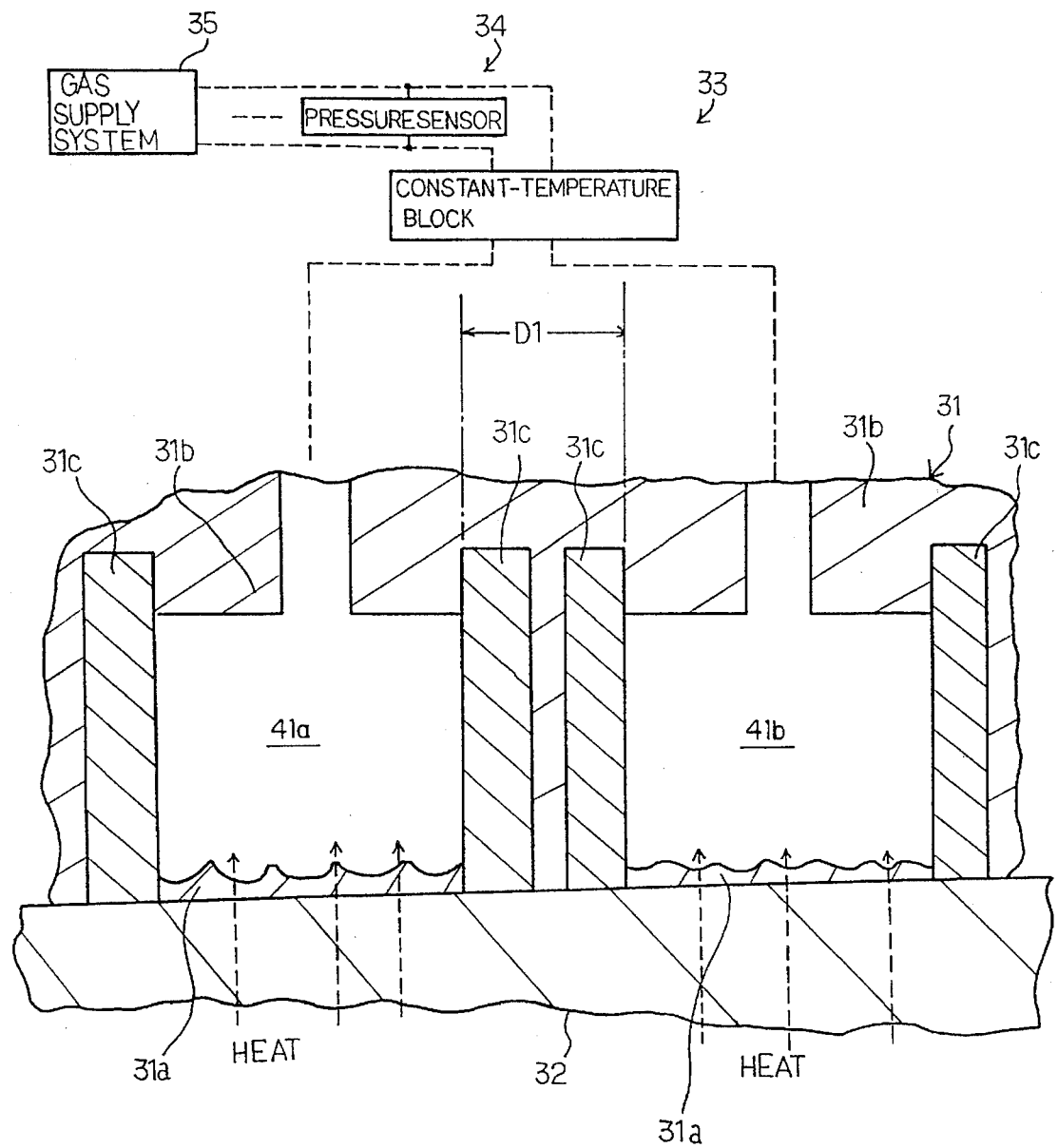
FIG. 7A is a cross sectional view showing a cell incorporated in a converting block of another temperature monitoring apparatus according to the present invention.

Turning to FIG. 7A of the drawings, a converting block 31 is mounted on a heater unit 32, and is forming a part of a temperature monitoring apparatus embodying the present invention. Although the temperature monitoring apparatus further comprises a gas distribution network 33, a pressure sensor array 34, a gas supply system 35, a thermo couple (not shown), a pressure gauge and a data processing unit (not shown), these components are similar to those of the first embodiment, and detailed description is omitted for avoiding repetition.

A plurality of cells 41a and 41b are formed in the converting block 31, and are connected through the gas distribution network 33 to the pressure sensor array 34. Bottom portions 31a, and upper portions 31b of the converting block 31, and heat insulating walls 31c, define the cells 41a and 41b.

Figure 7B:
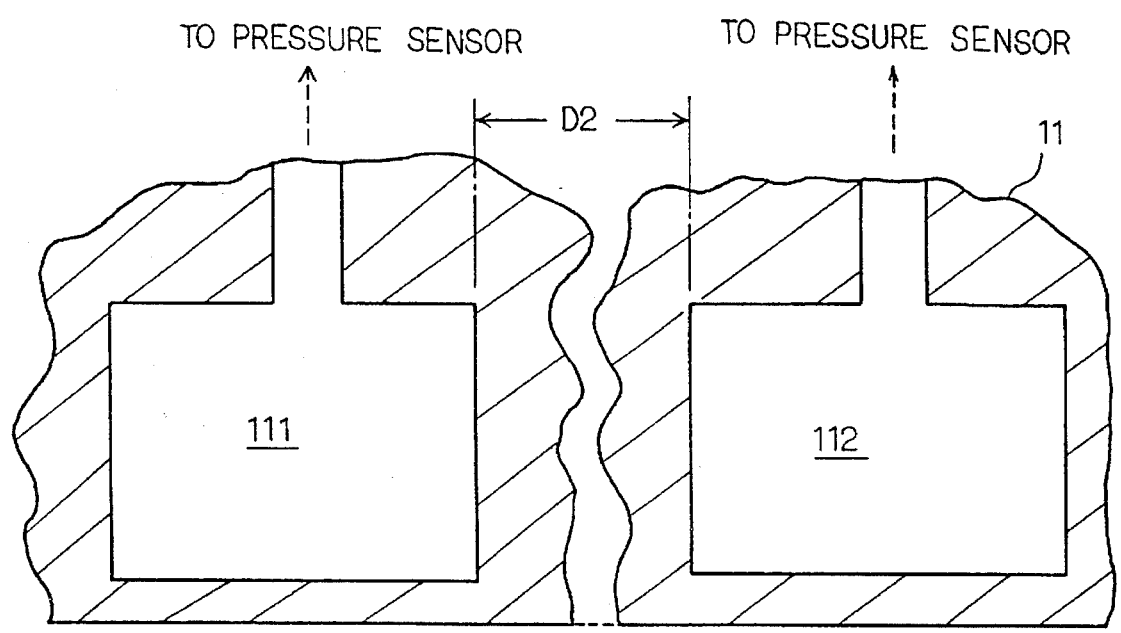
FIG. 7B is a cross sectional view showing the cell incorporated in the converting block of the temperature monitoring apparatus shown in FIG. 2.

The bottom portions 31a are formed of highly heat conductive material, and have respective corrugated inner surfaces. For this reason, the area exposed to each cell 41a/41b is increased rather than that of the cell 111/112/113/114/11n (see FIG. 7B), and heat is effectively transferred to the cells 41a and 41b.

The heat insulating walls 31c are formed of heat insulating material, and prevent heat from being transferred between adjacent cells. As a result, the data processing unit (not shown) can determine a temperature distribution strictly proportional to the temperature distribution of the heater unit 32. Moreover, it is possible to decrease the distance D1 between the adjacent cells 41a/41b. Since the distance D1 is shorter than the distance D2 between the adjacent cells 111/112 (see FIG. 7B), the cells 41a/41b are formed at a high density, and the temperature monitoring apparatus implementing the second embodiment precisely determines the temperature distribution on the heater unit 32.

Thus, the second embodiment enhances the accuracy of the measurement by virtue of the corrugated inner surfaces and the heat insulating walls 31c. Of course, the second embodiment achieves all of the advantages of the first embodiment.

Although particular embodiments of the present invention have been shown and described, it will be obvious to those skilled in the art that various changes and modifications may be made without departing from the spirit and scope of the present invention.

For example, only one differential pressure sensor unit may be connected through a valve array to the pipe lines 121 to 12n so as to sequentially supply the gas pressures of the cells together with the gas pressure of the reference cell to the only one differential pressure sensor by controlling the valve array.

Moreover, the temperature monitoring apparatus is not limited to a chemical vapor deposition system, but is available for measuring a temperature distribution among areas extending two dimensionally or distributed three dimensionally in a zone in so far as the cells are held in contact therewith.

A temperature monitoring apparatus may not have the differential pressure sensor units directly connected to the converting block.

What is claimed is:

1. A temperature monitoring apparatus used for monitoring a plurality of areas for temperature distribution between the areas, comprising:

a) a heat conductive means defining a plurality of cells supplied with heat from said plurality of areas, each of said plurality of cells being filled with gas;

b) at least one pressure sensor unit having two input ports respectively connected to two cells selected from said plurality of cells, said pressure sensor unit operable to measure a pressure difference between said two input ports;

c) an initial condition measuring means operative to measure an initial temperature and an initial gas pressure of one of said two cells before said temperature distribution takes place between said plurality of areas; and d) a data processing unit calculating a temperature difference between said two cells on the basis of said initial temperature, said initial pressure and said pressure difference after said temperature distribution takes place.

2. The temperature monitoring apparatus as set forth in claim 1, further comprising e) a pipe line network having a plurality of pipe lines connected between said plurality of cells and said two input ports of said at least one pressure sensor, and a constant temperature block held in contact with said plurality of pipe lines for decreasing any existing temperature differences among said pipe lines.

3. The temperature monitoring apparatus as set forth in claim 2, in which a volume ratio of each of said plurality of pipe lines to the associated cell is equal to or less than 0.01.

4. A temperature monitoring apparatus provided for monitoring temperatures at different locations in a heat source for a temperature distribution between said locations, comprising:

a) a converting block having a plurality of cells each filled with gas, said converting block capable of transferring a plurality of heat fluxes to said plurality of cells, one of said plurality of cells serving as a reference cell;

b) a plurality of differential pressure sensor units having respective first input ports connected to said reference cell and respective second input ports respectively connected to the others of said plurality of cells, and operative to measure pressure differences between gas pressures in said others of said plurality of cells and a gas pressure in said reference cell for generating first signals indicative of said pressure differences, respectively, in the presence of said temperature distribution;

c) a gas supplying system for supplying said gas to each of said plurality of cells;

d) a measuring means operative to measure an initial pressure of said plurality of cells and an initial temperature of said plurality of cells before said temperature distribution takes place, said measuring means being further operative to measure a pressure of the gas in said reference cell after said temperature distribution takes place, said measuring means being further operative to generate a second signal indicative of said initial pressure, a third signal indicative of said initial temperature and a fourth signal indicative of said pressure of said gas in said reference cell; and e) a data processing unit responsive to said second signal, said third signal and said fourth signal for calculating a temperature of said gas in said reference cell, said data processing unit being further responsive to the first signals supplied from the differential pressure sensor units associated with said others of said plurality of cells for calculating temperature differences between the gases in said others of said plurality of cells and said reference cell.

5. The temperature monitoring apparatus as set forth in claim 4, further comprising f) a gas distribution system having
      a first pipe line for connecting said reference cell to first input ports of said plurality of differential pressure sensor units, said measuring means and said gas supplying system,
      a plurality of second pipe lines for connecting said others of said plurality of cells to respective second input ports of said plurality of differential pressure sensor units and said gas supplying system, and
      a constant temperature block provided for said first pipe line and said plurality of second pipe lines for decreasing temperature differences among said first pipe line and said plurality of second pipe lines.

6. The temperature monitoring apparatus as set forth in claim 5, in which said constant temperature block has a case member through which said first pipe line and said plurality of second pipe lines pass, and a highly heat conductive substance filling said case member and transferring heat among said first pipe line and said plurality of second pipe lines.

7. The temperature monitoring apparatus as set forth in claim 6, in which said highly heat conductive substance is liquid so as to cause said temperature differences to fall within 1 degree centigrade.

8. The temperature monitoring apparatus as set forth in claim 5, in which a volume ratio of each of said first and second pipe lines to the associated cell is equal to or less than 0.01.

9. The temperature monitoring apparatus as set forth in claim 4, in which said plurality of cells are equally spaced from said heat source.

10. The temperature monitoring apparatus as set forth in claim 4, in which said converting block comprises first wall portions respectively having corrugated surfaces partially defining said plurality of cells, respectively, said heat fluxes being transferred through said first wall portions to said plurality of cells, respectively.

11. The temperature monitoring apparatus as set forth in claim 10, in which said converting block further comprises second wall portions partially defining said plurality of cells, respectively, and protecting the associated cells from heat transferred from adjacent cells, said second wall portions being formed of a substance with less thermal conductivity than a substance forming said first wall portions.

12. The temperature monitoring apparatus as set forth in claim 4, in which said measuring means has a temperature sensor for measuring said initial temperature, and a pressure gauge for measuring said initial pressure and said pressure after said temperature distribution takes place.

* * * * *